United States Patent [19]

Oldham

[11] 4,259,543

[45] Mar. 31, 1981

[54] CABLE TERMINATION

[75] Inventor: Ronald C. Oldham, Chandlers Ford, England

[73] Assignee: International Telephone and Telegraph Corporation, New York, N.Y.

[21] Appl. No.: 9,783

[22] Filed: Feb. 6, 1979

[30] Foreign Application Priority Data

Feb. 7, 1978 [GB] United Kingdom ............... 04851/78

[51] Int. Cl.³ .................................................. H02G 9/02
[52] U.S. Cl. .................................................... 174/70 S
[58] Field of Search ...................... 174/70 S, 88 C, 89

[56] References Cited

U.S. PATENT DOCUMENTS

| | | | |
|---|---|---|---|
| 3,600,499 | 8/1971 | Hibbs | 174/70 S |
| 4,064,358 | 12/1977 | Smith, et al. | 174/70 S |
| 4,103,104 | 7/1978 | Spollen | 174/70 S |

*Primary Examiner*—Roy N. Envall, Jr.
*Attorney, Agent, or Firm*—William T. O'Neil

[57] ABSTRACT

A cable termination between a main coaxial cable and apparatus, such as a repeater housing. The outer conductor of the main cable is shielded by an effectively continuous tube of electrically conductive material extending from the end of the outer conductor of the main cable to the housing apparatus. A flexible bellows assembly can be used at the end of the tube connected to the repeater housing to accommodate relative movement between the cable and the repeater housing during installation.

14 Claims, 3 Drawing Figures

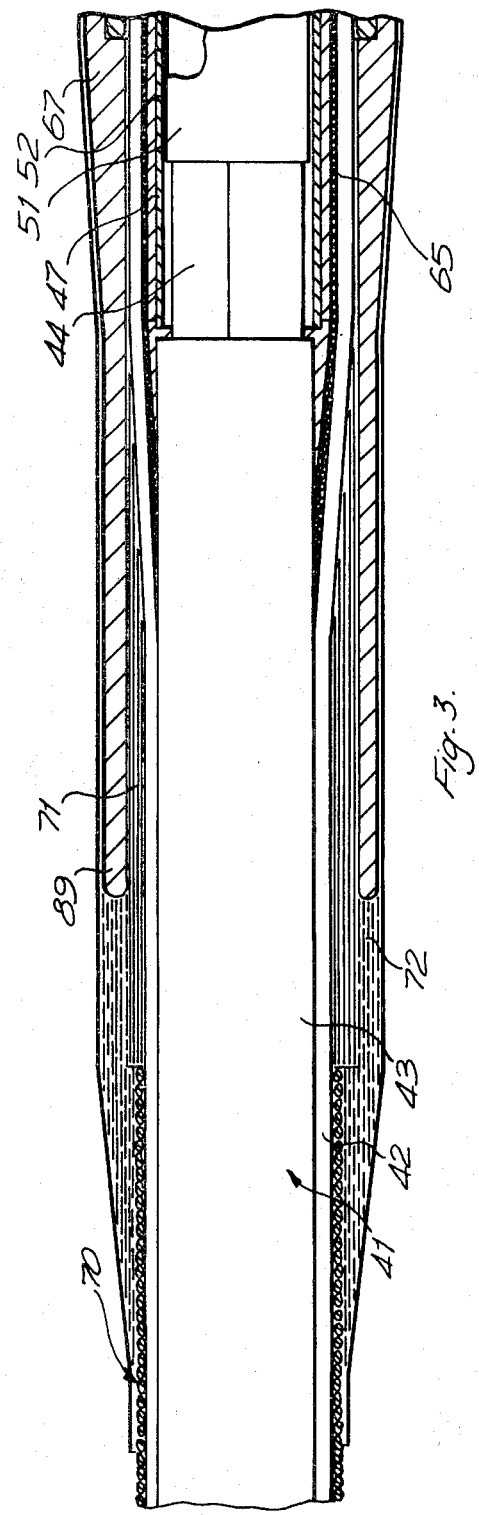

CABLE TERMINATION

BACKGROUND OF THE INVENTION

1. Field of the Invention

This invention relates to cable jointing or termination, particularly but not exclusively in submarine coaxial cable arrangements.

2. Description of the Prior Art

In the prior art there have been various approaches to the problem of terminating a submarine cable for interface with another cable, or more commonly, with a submerged housing, such as contains repeater equipment, for example. The problem of providing watertight termination devices at the very great fluid pressures encountered on an ocean floor, further in view of the long term corrosive nature of sea water, has been addressed since the earliest days of transoceanic telephone and telegraph cables. More recently, coaxial telecommunications cables have been installed transocean, these raising many of the same mechanical and environmental problems and also some new problems, such as signal leakage due to imperfect shielding at cable interfaces.

Some known prior art in the area of interest includes U.S. Pat. Nos. 3,673,314; 2,155,650; and 2,697,739. Those patents deal with cable termination generally. Copending U.S. patent application Ser. No. 927,667, filed July 24, 1978, entitled "Mechanical Submarine Cable Termination," discloses certain submarine cable termination apparatus of interest, but is adapted particularly for optical fiber cabling and, therefore, does not require shielding or integrity of coaxial cable outer conductor continuity.

The manner in which the invention deals with the prior art problems to produce a structure which allows much less electrical signal leakage and facilitates improved coaxial cable outer-conductor integrity will be understood from the description hereinafter.

SUMMARY

According to one aspect of the present invention, there is provided a termination (joining) between a main coaxial cable and the repeater housing, wherein both the inner and outer conductors of a tail coaxial cable extending from the repeater housing and, there is a tapered moulding between the cables. The inner conductor of the main cable and the joint between itself and the inner conductor of the tail cable are shielded by an effectively continuous tube of electrically conductive material which extends from the end of the outer conductor of the main cable over the taper molding to a position where it is connected to the repeater housing.

According to another aspect of the present invention there is provided a method of terminating (joining) a main coaxial cable to a repeater housing having a tail coaxial cable extending therefrom and of smaller diameter than the main cable. The method comprises providing a ferrule and joining the main and tail cable inner conductors together via the ferrule, molding dielectric material over the ferrule to bond integrally with the dielectric of the main and tail cables, the molded dielectric tapering in diameter between the main and tail cables, providing a flexible conductive material over the molded dielectric, establishing electrical continuity between the conductive material and the main cable outer conductor and between the conductive material and the tail cable outer conductor, providing an electrical shielding or screening tube assembly and arranging it to extend over the conductive material, and establishing electrical continuity between the outer conductor of the main cable and the tube assembly at one end thereof, and between the repeater housing and the tube assembly at the other end thereof.

BRIEF DESCRIPTION OF THE DRAWINGS

Embodiments of the invention will now be described with reference to the accompanying drawings, in which:

FIGS. 2 and 3 show partly sectioned and partly cutaway the elements of a second embodiment of a termination of an armored submarine coaxial cable into a repeater housing and connected to a repeater tail cable.

DETAILED DESCRIPTION OF THE DRAWINGS

Figure 1:
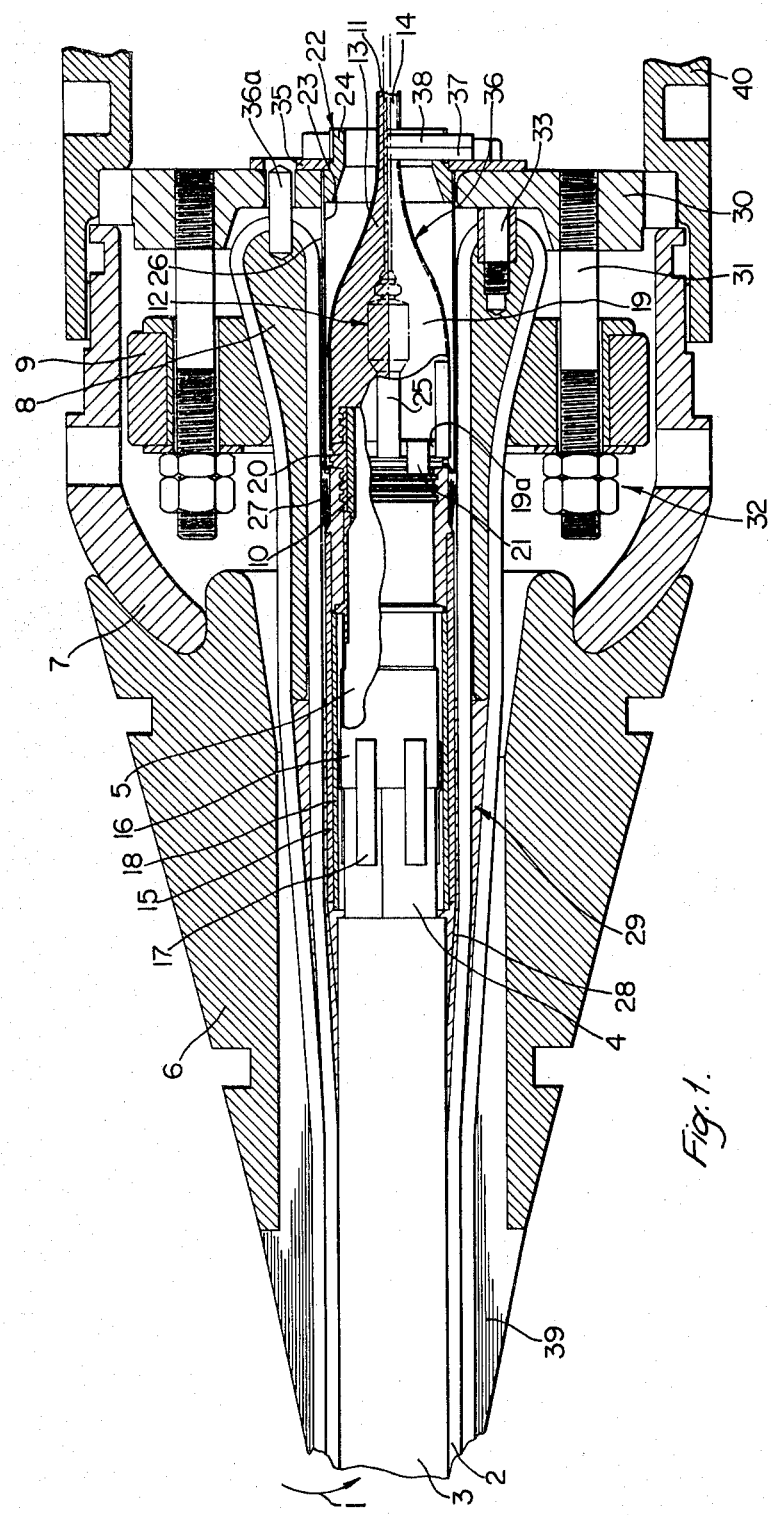
FIG. 1 shows, partly sectioned and partly cutaway, a first embodiment of a termination of an armored submarine coaxial cable into a repeater housing and connected to a repeater tail cable.

Referring to FIG. 1, a main submarine coaxial cable 1 has an armoring of wire 2, an outer extruded plastics sheath 3, a longitudinally extending tubular copper outer conductor 4, a dielectric core 5, of for example polyethylene and an inner conductor (not shown). Prior to the preparation of the cable end in order to make the termination, the following parts are slipped over the cable end; a dome cover 7, and a packing sleeve 15.

The armor wires 2 are then unlayed over a predetermined distance, to expose the sheath 3, and held clear of the cable end until required again. The length of the actual cable end is reduced and prepared in a conventional manner for exposing the outer conductor 4 and inner conductor (not shown) and receiving a conventional castellated water barrier tube subassembly 10. The inner conductor is jointed to a tail cable inner conductor 11 via a conductor ferrule 12.

A rigid tubular conductive member in the form of a copper spinning 16 is soldered to the end of and forms part of the subassembly 10 and over laps the outer conductor 4, as shown by a small distance, typically about one inch, and electrical connection between the two is insured by spot soldering or otherwise securing a number of flexible copper braid tails 17 longitudinally at the end of the overlap region. A split packing tube 18 is arranged over the copper spinning 16 and the exposed end of the outer conductor. The oversheath tube 15 is then brought up over split packing tube 18 and a dielectric molding 13 is then made, in a conventional manner, to extend from the end of the split sleeve 18 and including oversheath tube 15 adjacent to the water barrier tube subassembly 10, over the water barrier tube subassembly 10 and the conductor ferrule, to the tail cable dielectric 14. A restoration molding is then made to seal the ends of the oversheath tube and packing tube to the cable sheath 3.

A tapered, flexible, copper braid subassembly 19, is then positioned over the dielectric 13 to form the tail cable outer conductor from the outermost castellation 20 of the water barrier tube subassembly 10. The braid subassembly 19 may be formed from a braid, for example, in known manner and may be formed as a frustoconical member as described in copending patent application Ser. No. 941,089, filed Sept. 11, 1978, entitled "Cable Termination Apparatus." The braid subassembly 19 is electrically connected to the castellation 20 via spot-soldering, or is otherwise conductively and mechanically secured. Barrier tube tabs 21 in the form of copper strips are brazed to the locating castellation 20, and electrically connected to the tapered braid assembly 19. The larger end of the braid is electrically and mechanically connected between inner and outer conductive rings such as 19a, and braid tails 25 are soldered to this ring 19a. The braid 19 is provided with a corrosion protective layer of compound such as that sold under the Trade Mark TELECOMPOUND and by a tape wrapping 34 to enhance the life of the braid in the presence of water.

A copper screening tube subassembly 22 comprising a copper tube 23 and a brass collar 24, which is threaded as shown, is positioned to extend from the end of the castellation 20 over the termination braid subassembly 19 and the tape wrapping 34, as shown. The tube 23 is spot soldered, or otherwise secured in an electrically conductive manner to the taper braid subassembly 19 by means of a number of longitudinal copper braid tails 25 which are soldered to the conductive ring 19a. The tube 23 is provided with a protective coating by means of a tape application 26, and the space 27 around the dielectric 13 is filled by means of a tape winding and a filling compound. Filling material 28 is arranged over the sheath and the packing sleeve 15 as shown. The unwound armor wires 2 are then relaid nearly up to collar 24, the armor cone 8 is pulled up to adopt the position shown and the wires 2 are relaid back over it, as shown, and securely bound to the cable by means not shown, but known per se. The space 29 around the end of the armor cone 8 is filled with a suitable material 28 for example a winding of a cord, during the armor relaying operation.

An armor anchor plate 30 with studs such as 31 is positioned over the collar 24 of the screening tube subassembly 22, the anchorage assembly 9 is pulled up into position over the anchor cone 8 and secured to the armor anchor plate 30 via the studs 31 and double nut (lock) arrangements such as 32. The anchor plate is held off from the anchor cone at positions such as 33, in order to prevent the armor wire from being deformed. Anti-rotation pins 36a extend from a cone 8 into the arm and plate 30 to prevent torsional movement of the cable with respect to a repeater casing 40.

A plate washer 35 is secured to the armor anchor plate 30 via socket screws. A nut 37 and a lock nut 38 are screwed onto the threading of collar 24, thereby securing the copper shield tube assembly 22 to the armor anchor plate 30, which is subsequently secured to the repeater casing 40.

The dome cover 7 is pulled up into position, and packing tape 30 is used to build up the space between the boot 6 and the cable. The termination is completed in a conventional manner by attaching the tail cable having outer conductor 14 to a repeater tail cable (not shown) and screwing the dome cover 7 into the end of the repeater casing 40, thereby securing the anchor plate therebetween.

The copper spinning 16 forms a rigid conductive extension of the subassembly 10 back to an overlap with the outer conductor 4 of the main cable 1. Relative movement between the cable end of the spinning 16 and the outer conductor 4 is accommodated by the flexible braid tails 17. The copper spinning 16 provides improved shielding over the tubular braid previously used and, furthermore, the secondary screening tube 23 likewise improves the screening provided by the assembly 19. Similarly relative movement between the water barrier assembly 10 and the screening tube 23 is achieved with flexible tabs 21.

Figure 2:
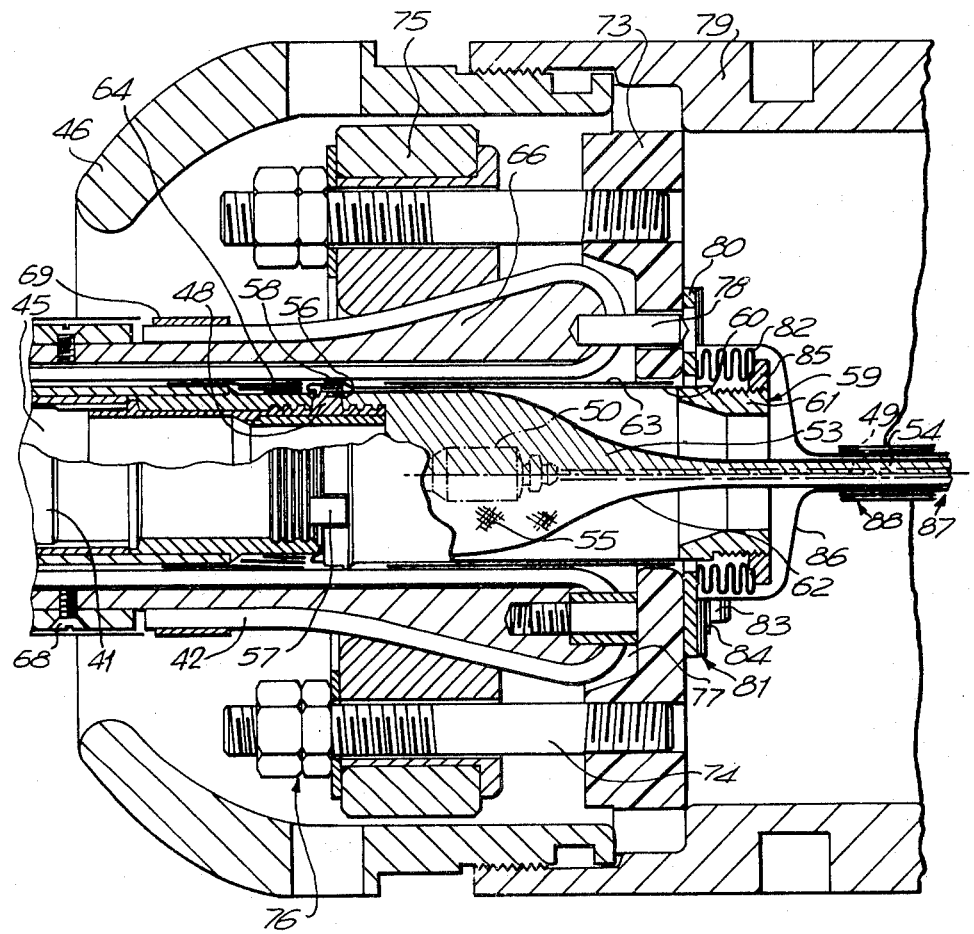

In FIG. 2 an alternative embodiment is shown having additional stress relieving apparatus. To avoid confusion a portion of the main cable as it fits into FIG. 2 is shown separately in FIG. 3. These two figures are accordingly described together.

Referring now to both FIGS. 2 and 3, another embodiment is shown. Herein, a main submarine coaxial cable 41 has a serving layer 70, an armoring of wire 42, an extruded plastics sheath 43, a longitudinally extending tubular outer conductor 44, a dielectric core 45, of for example polyethylene, and an inner conductor (not shown). Prior to the preparation of the cable end in order to make the termination, a dome cover 46 is slipped over the cable end. Part of the serving layer 70 is removed and the armor wires 42 are unlayed over a predetermined distance, to expose the sheath 43, and held clear of the cable end until required again. An oversheath tube 47 is then slipped over the cable end. The length of the actual cable end is reduced and prepared in a conventional manner for exposing the outer conductor 44 and the inner conductor (not shown) and receiving a conventional castellated water barrier tube subassembly 48. The inner conductor is jointed to a tail-cable, inner conductor via a conductor ferrule 50.

A rigid tubular conductive member in the form of a copper skirt 51 is soldered to one end of and forms part of the subassembly 48, and overlaps the outer conductor 44 to which it is soldered, to ensure electrical connection between the two parts. A split packing tube 52 is arranged over the copper skirt 51 and the exposed end of the outer conductor. The oversheath tube 47 is then brought up over split tube 52 and a dielectric molding 53 is made, in a conventional manner, to extend from the end of the oversheath tube 47 and including packing tube 52 adjacent to the water barrier tube subassembly 48, and over the conductor ferrule 50 to the tail-cable dielectric 54. A restoration molding is then made to seal the ends of the oversheath tube 47 and the split packing tube 52 to the cable sheath 43. A tapered, flexible, copper braid subassembly 55, having inner and outer rings secured to the wider diameter end thereof, is positioned over the dielectric modling 53 to form a tail-cable outer conductor from the castellation 56 of the water barrier tube subassembly 48. The braid subassembly 55 may be formed from a braid in known manner, and may be formed as a frusto-conical member as described in the aforementioned copending U.S. Patent Application, Ser. No. 941,089, filed Sept. 11, 1978. The braid subassembly 55 is electrically connected to the castellation 56 via spot-soldered barrier tube tabs 57 in the form of copper strips which are brazed to the castellation 56. The braid 55 is provided with the same protective layer as that described for the comparable part in FIG. 1 and by a tape wrapping 62 to enhance the life of the braid 55 in the event of water seepage.

A tubular copper shielding subassembly 59, comprising a copper tube 60 and a brass collar 61 which is threaded as shown, is positioned to extend from castellation 56 over the termination braid subassembly 55 with tape wrapping 62 as shown. The tube 60 is soldered to the outer ring 58 of the taper braid subassembly 55. The tube 60 is provided with a protective coating by means of a tape application 63, and the space 64 around the dielectric 53 is filled by means of a tape winding and a filling compound. Filling material 65 is arranged over the sheath 43 and oversheath tube 47 is shown. The unlayed armor wires 42 are then relaid and the armor cone 66 having an extension 67 secured to it by screws 68, or a one-piece equivalent to 66 and 67, is positioned as shown over the armor wires 42 which are then relaid back over cone 66 and secured to it by a circumferentially tightened clip 69. The cone extension 67 serves to protect the soldered joints by preventing the cable from flexing or bending in the vicinity thereof. The space 71 around the armor wires 42 and wider cone extension 67 is filled with a suitable material, such as layers of tape, during the armor relaying operation. A packing tape 72 is used to cover the exposed end of the tapefilled space 71 and extends over the serving 70 and the cone extension 67 as shown.

An armor anchor plate 73 with studs such as 74 is positioned over the end of the shielding tube 59. An anchorage clamp arrangement 75 is arranged in position over the armor wires 42 on the armor cone 66 and secured to the armor plate 73 via the studs 74 and nuts and lock nuts such as 76. The anchor plate 73 is held off the armor cone 66, at a spaced position (see 77), in order to prevent the armor wires 42 from being deformed. Anti-rotation pins 78 extend from the cone 66 into the anchor plate 73 to prevent torsional movement of the cable with respect to a repeater casing 79.

A plate washer 80 and a plastic washer 81 of polyethylene for example are secured to the armor anchor plate 73 via socket screws such as 83 with plain washer 84. One end of a flexible metallic bellows 82 is secured between the plate washer 80 and the plain washer 84 so as to be in electrical connection with with the plate washer 80 and the anchor plate 73. The other end of the bellows has a threaded collar 85 brazed thereto which is screwed onto the brass collar 61. Sleeve 86, also of a plastic material such as polyethylene is arranged over the bellows assembly and secured to the plate washer 80 and together with the plastic washer 81 keeps dirt and contamination away from the bellows, the termination within the tube 60, collar 61 and bellows 82. The smaller diameter end of the sleeve 86 is secured to the tail-cable 87 by means of a tape winding 88. The sleeve 86 is of such dimensions as to permit movement of the bellows, etc., therein. The copper shielding tube assembly 59 is secured to the armor anchor plate 73 via the bellows assembly 82 which thus also ensures electrical screening continuity between the screening tube assembly 59 and the repeater casing 79.

The tail cable 87 is connected to a repeater tail cable (not shown) in the same conventional manner as contemplated for the FIG. 1 configuration. The dome cover 46 is pulled up into position and screwed into the repeater casing 79 with the armor anchor plate 73 captured and secured therebetween. A split-rubber buffer arrangement (not shown) may be positioned over the tape covered armor cone extension 67 to extend up to the dome cover 46, and to facilitate subsequent application of a protective tape wrapping over the repeater between the two cable ends joined thereby.

Means may be included to prevent twisting of the cable 41 causing damage to the soldered joints between the copper skirt 51 and the water barrier tube subassembly 48, or between the copper skirt 51 and the outer conductor 44, of the armor cone extension 67. This may be achieved by means of a cable clamp (not shown) provided with means for clamping it to the cable 41 and securing it to the end 89 of extension 67, in order to prevent cable twisting with respect to the armor cone extension 67. Such a twist-prevention device is necessary since the barrier tube subassembly 48 is held in the molded dielectric 53 and, therefore, acts as a fixed point. If the outer cable elements twist relative to the inner core (dielectric 45 and the inner conductor) strain will be placed on the components adjacent the fixed point, which will result in damage to the soldered joints.

The shielded termination described above with reference to FIG. 2 is particularly but not exclusively designed for use as a submarine cable land termination for a land-based repeater to be arranged in a duct or trench. If there is tensile load on the cable during its emplacement in the trench of pulling it through a duct, the bellows 82 accommodates relative movement between the cable and the repeater housing, preventing damage to the termination, while at the same time, providing continuity of the screening between the tube 60 and the armor anchor plate 73.

The cable terminations shown in the two illustrated embodiments are totally enclosed for shielding purposes. In the embodiment of FIG. 2 this shielding is achieved by means of the copper skirt 51, the subassembly 48 and the tube 60, between the copper outer conductor 44 and the repeater casing 79. The bellows arrangement gives the necessary relative movement provided by the flexible braid tails 17 and 21 in the embodiment of FIG. 1. The bellows arrangement has proven to give superior shielding in comparison with the flexible braid tails alone, which allow a certain amount of electrical leakage.

If the submarine coaxial cables are of the lightweight type, which are normally unarmored, armor wires are laid up over the cable sheath for a nominal distance (on the order of 22 meters) extending back from the end of a cable before a central strengh member over which a tubular inner conductor is formed, and if such a cable is terminated and screened as described above, the inner conductor assembly would be bonded into the conductor ferrule 12 in a conventional manner.

It is alternatively possible to use the methods of shielding described hereabove with apparatus basically constructed in accordance with the disclosure of the aforementioned U.S. patent application, Ser. No. 941,089. That structure avoids the use of the costly water barrier tube assembly described in the above embodiments, but is consistent with the herein disclosed shielding (screening) method and apparatus.

What is claimed is:

1. A termination structure for interfacing a main coaxial cable and a sealable housing, the inner and outer conductor of said main cable being joined to the inner and outer conductor of a tail coaxial cable extending from said housing, respectively, comprising:
   first means comprising a tapered dielectric molding between the interface ends of said main and tail cables with a conductive mesh shaped to the outer surface of said tapered part;
   second means comprising a continuous conductive tube extending between said main cable outer conductor and the wall of said housing;
   and third means for mechanically and electronically anchoring said conductive tube to said housing wall at one end, and for electrically securing said tube to said main cable outer connector at the other end.

2. Apparatus for terminating a main coaxial cable to a sealed housing, comprising:

first means for electrically joining the inner and outer conductors of a tail coaxial cable extending from said sealed housing to the inner and outer conductors of said main coaxial cable respectively, said tail coaxial cable being of substantially smaller diameter than said main cable;

a tapered dielectric molding formed about said inner conductors between interfacing ends of said main and tail cables, said molding providing transition substantially between said main and tail cable outer conductor inner diameters;

second means comprising a formed conductive mesh emplaced over said tapered molding and electrically bonded at on one end to said main cable outer conductor and to said tail cable outer conductor at the other end;

a bulkhead member comprising a part of said sealed housing, and means for conveying said tail cable therethrough;

and third means radially outward of and substantially coaxial with said second means, said third means including a solid conductive tube electrically and mechanically anchored on one end to said bulkhead member and at its other end to said main cable outer conductor, thereby to provide substantially uninterrupted shielding over said second means, thereby to reduce electrical signal leakage.

3. A termination according to claim 1, wherein said conductive tube includes a castellated conductive tubular member which is held in a water-tight plastic molding and forms part of a water barrier sealed to the outer sheath of the main cable and also sealed to dielectric material between the inner and outer conductors in the region of the joint between the inner conductors of the main and tail cables, said castellated conductive tubular member having an electrically conductive part exposed outside said water barrier.

4. A termination according to claim 3, wherein said conductive tube includes a second tubular member of solid conductive material rigidly held to the repeater housing at one end and connected at its other end to said exposed part via at least one conductive flexible connecting member.

5. A termination according to claim 3, wherein said tube of electrically conductive material includes a further tubular member of solid conductive material which, at one end, is rigidly held and electrically connected to a portion of the first conductive tubular member, the further member being disposed beneath a portion of sheath of the main cable which has been restored during fabrication of said termination, the further member, at its other end, closely overlapping the outer conductor of the main cable and being electrically connected to the main cable outer conductor via at least one flexible electrically conductive member.

6. A termination according to claim 3, wherein the outer conductor of the repeater tail cable is connected to the smaller end of a tapered electrically conductive braid, the larger end of the braid being electrically connected to said exposed part.

7. A termination according to claim 6 wherein the larger end of the tapered electrically conductive braid is connected between electrically conductive inner and outer rings so that the larger end of the braid is rigid, the second tubular member being connected to said exposed part via at least one flexible electrically conductive member connected between the rigid end of the braid and the other end of said second tubular member.

8. A termination according to claim 1, wherein said conductive tube includes a first tubular member of solid conductive material held at one end to the repeater housing via a flexible bellows assembly and electrically connected at its other end to the main cable outer conductor.

9. A termination according to claim 8, wherein said conductive tube further includes a castellated conductive tubular member which is held in a water-tight plastic molding and forms part of a water barrier sealed to the outer sheath of the main cable and sealed to dielectric material between the inner and outer conductors in the region of the joint between the inner conductors in the region of the joint between the castellated conductive tubular member having an electrically conductive part exposed outside said water barrier, and wherein the other end of said first tubular member of solid conductive material is electrically connected to the main cable outer conductor via the exposed part.

10. A termination according to claim 9, wherein said conductive tube includes a further tubular member of solid conductive material which, at one end, is rigidly held and electrically connected to a portion of the castellated conductive tubular member, the further tubular member being disposed beneath a portion of the sheath of said main cable which has been restored during making of the termination, said further tubular member, at its other end, closely overlapping and being electrically connected to the outer conductor of said main cable.

11. A termination according to claim 10, wherein said first tubular member is electrically connected at its other end to said exposed part by soldering, and the further tubular member is electrically connected to the main cable outer conductor by soldering.

12. A termination according to claim 11, wherein the main coaxial cable is provided with a protective layer of armoring wires at least over a portion of its length adjacent the repeater housing, and wherein the armoring wires are terminated and their tensile load transferred to the repeater housing by means of an anchor assembly including an armor cone, an anchor plate and an armor clamping arrangement, the armor cone being of such a length as to extend over the soldered connections, the cable adjacent the soldered connections, and the bellows assembly being connected to said housing via said anchor plate.

13. A termination according to claim 12 wherein said bellows assembly is arranged within a protective sleeve held to the anchor plate at one sleeve end and to the tail cable at the other sleeve end, which sleeve is of such dimensions as to permit axial flexing of the bellows therein.

14. A termination according to claim 13, wherein said main cable is clamped to said armor cone thereby to prevent twisting of the main cable with respect thereto for protecting said soldered connections from damage.

* * * * *